(No Model.) 3 Sheets—Sheet 1.

E. MERRITT.
NAILING MACHINE FOR BOOTS AND SHOES.

No. 251,453. Patented Dec. 27, 1881.

Witnesses.
Henry Chadbourn.
John H. Foster.

Inventor.
Edward Merritt
by M. Van Gudren
is atty.

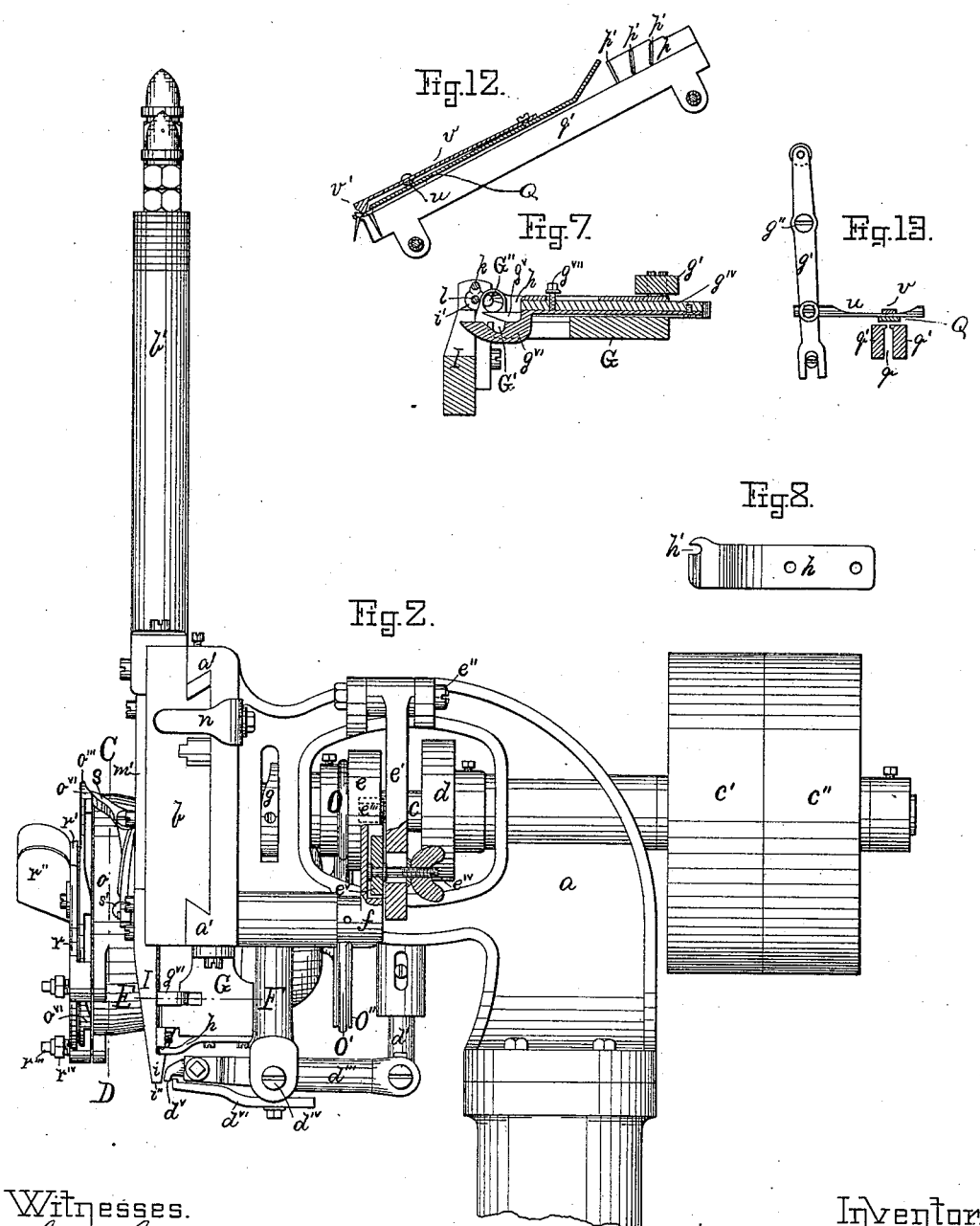

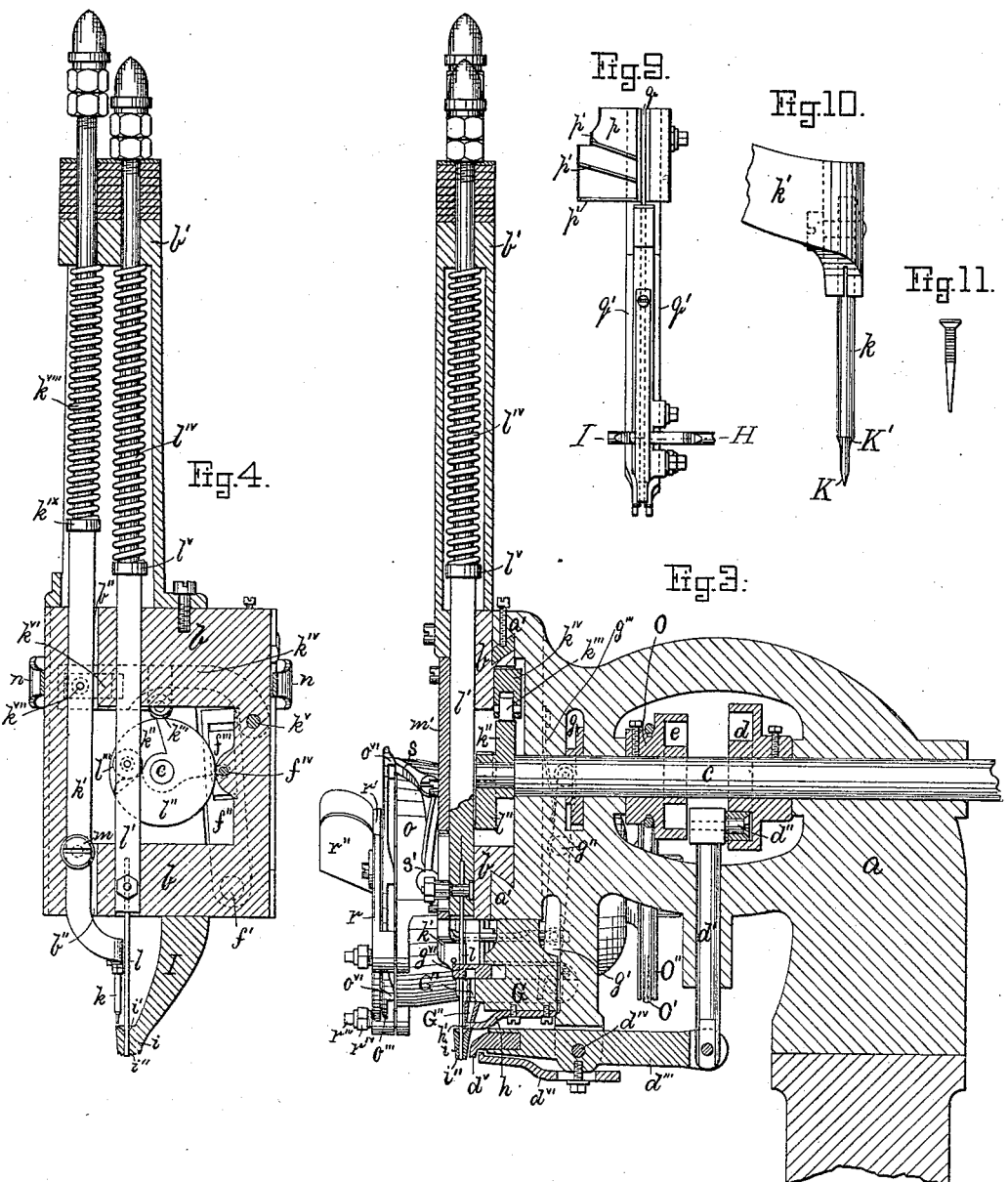

UNITED STATES PATENT OFFICE.

EDWARD MERRITT, OF BROCKTON, ASSIGNOR, BY DIRECT AND MESNE ASSIGNMENTS, TO DUNBAR, HOBART & WHIDDEN, OF SOUTH ABINGTON, MASSACHUSETTS.

NAILING-MACHINE FOR BOOTS AND SHOES.

SPECIFICATION forming part of Letters Patent No. 251,453, dated December 27, 1881.

Application filed October 17, 1881. (No model.)

*To all whom it may concern:*

Be it known that I, EDWARD MERRITT, a citizen of the United States, residing at Brockton, in the county of Plymouth and State of Massachusetts, have invented certain new and useful Improvements in Nailing-Machines for Boots and Shoes; and I do hereby declare that the same are fully described in the following specification and illustrated in the accompanying drawings.

Figure 6:
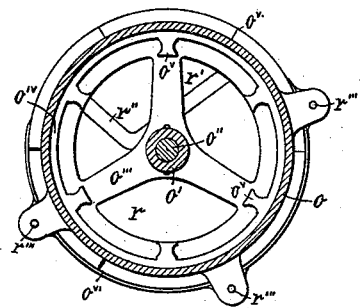
Figure 5:
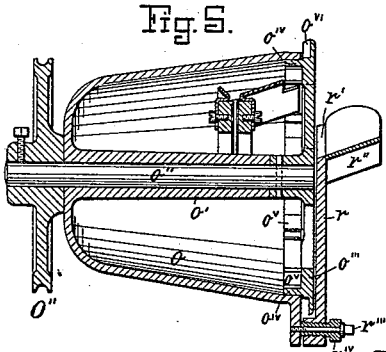
Figure 1:
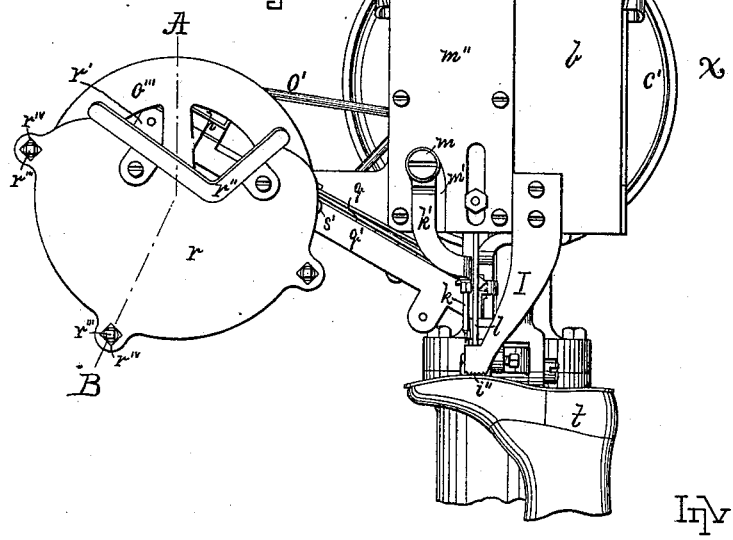

On the accompanying drawings, Figure 1 represents a front elevation of the machine. Fig. 2 represents a side elevation, seen from X in Fig. 1. Fig. 3 represents a central longitudinal section over the driving-shaft and driver-bar of the machine. Fig. 4 represents a sectional front elevation of the head and the driver and awl bars. Fig. 5 represents a cross-section of the nail-receptacle on the line A B, shown in Fig. 1. Fig. 6 represents a cross-section of the said nail-receptacle on the line C D, shown in Fig. 2. Fig. 7 represents a cross-section of the nail picker on the line E F, shown in Fig. 2. Fig. 8 represents a plan view of the perforated nail-rest. Fig. 9 represents a plan view of the nail-raceways and the ribbed shield. Fig. 10 represents a detail view of the awl-bar, and Fig. 11 represents a side view of the nails to be driven. Fig. 12 is a detail sectional view of the raceway; and Fig. 13 shows a cross-section of the raceways on the line I H, shown in Fig. 9.

Similar letters refer to similar parts wherever they occur on the different parts of the drawings.

$a$ is the frame of the machine, having V-shaped horizontal guides $a'$ $a'$ for the laterally-movable head $b$, as will be more fully described.

$c$ is the driving-shaft, movable in bearings in the frame $a$, and provided with fast and loose pulleys $c'$ $c''$ in the usual manner.

To the shaft $c$ is secured a grooved face-cam, $d$, by means of which the vertical rod $d'$ is moved up and down, it being for this purpose provided in its upper end with a pin and roll, $d''$, projecting into the groove of the cam $d$. The rod $d'$ has its bearing in the frame $a$, as shown in Fig. 3, and it is jointed in its lower end to the rocker-bar $d'''$, that is movable on the fulcrum $d^{IV}$, and provided in its forward end with a foot or rest, $d^V$, for carrying the work away from the throat of the moving head $b$, to allow the latter to pass back and the awl to penetrate the shoe for the purpose of feeding the work to receive another nail. Attached to the rocker-lever $d'''$ is an adjustable gage, $d^{VI}$, for the purpose of gaging the distance of the nail to be driven from the edge of the shoe-sole, the advantage of which arrangement is that the gage $d^{VI}$ follows the work, so that it can be used to equal advantage on any thickness of leather.

On the driving-shaft $c$ is another grooved face-cam, $e$, that operates a rocking lever, $e'$, hung at $e''$ to the upper part of the frame $a$, and provided with a pin and roll, $e'''$, fitting within the groove of the cam $e$. The lower end of the lever $e'$ is provided with an adjustable connecting device consisting of a screw, $e^{IV}$, and adjustable block $e^V$, which is capable of vertical adjustment within the upper end of the lever $f$, which is secured to a horizontal rocker-shaft, $f'$, supported in a bearing in the frame $a$.

To the forward end of the rocker-shaft $f'$ is secured a rocker-lever, $f''$, in the upper end of which is a movable block, $f'''$, movable within a corresponding slot in said lever $f''$, as shown in Fig. 4. A pin or stud, $f^{IV}$, secured to the movable head $b$, passes through a corresponding perforation in the movable block $f'''$, by which arrangement a horizontal reciprocating motion is imparted to the head $b$ from the driving-shaft $c$ for the purpose of feeding the work. The desired amount of feed is adjusted by means of the connecting device $e^{IV}$ and $e^V$, which unites the rocker-levers $e'$ and $f$, as shown in Fig. 2.

On the driving-shaft $c$ is a face-cam, $g$, which operates a rock-lever, $g'$, (shown in dotted lines of Fig. 3,) hung on the fulcrum $g''$ and carried in by a spring, $g'''$. The lower end of the lever $g'$ is hinged to a sliding block, $g^{IV}$, (shown in Fig. 7,) to which the wedge-shaped nail-separator $g^V$ is attached, as well as an adjustable spring-gage bar, $g^{VI}$, to regulate for the use of various sizes of nails. The spring-gage $g^{VI}$ is adjusted by means of a set-screw, $g^{vii}$, passing through the sliding block $g^{iv}$, the latter being guided in a grooved bracket, G, secured to the under side of the frame $a$ in its forward end. The said bracket G has a recess, G', in its forward end for receiving the nail when forced from the raceway by the wedge-shaped separator $g^v$. To the under side of the aforesaid bracket G is secured a rest, $h$, for the point of the nail, which has a perforation, $h'$, (shown in Fig. 8,) through which the nail passes into the throat $i$, the point resting against the awl $k$ when down. The awl rising above the throat $i$ allows the nail to drop through the throat, and is driven by the driver $l$ into the hole in the sole previously made by the awl. The throat $i$ is secured to the lower part of the movable head $b$, and has a countersink, $i'$, in the upper part of it for receiving the nail when delivered from the recessed bracket G, through an intermediate tube, G'', secured to the throat-bracket I between the recessed end of the separator-bracket G and its lower rest, $h$. The throat $i$ has a corrugated under surface, $i''$, to hold the work in place and to prevent it from slipping, as usual.

$l$ is the driver secured to the lower end of the driver-bar $l'$, which is movable up by means of a cam, $l''$, on the driver-shaft $c$, and a roll and pin, $l'''$, on the driver-bar $l'$, and it is driven down by means of a coiled spring, $l^{iv}$, as usual, surrounding the driver-bar, between its collar $l^v$ and the upper bearing, $b'$, secured to the head $b$. The driver $l$ is made of spring-steel, so as to allow the awl-bar $k'$ to force it from its center while the awl-bar is being forced down to penetrate the sole previous to feeding the shoe and driving the nail.

The awl $k$ is secured to the lower end of the awl-bar $k'$, and is movable up and down in an enlarged groove, $b''$, in the movable head $b$, to permit a lateral motion to it for the purpose of allowing the awl to enter or pass down through the throat $i$ into the work to be fed. When being raised it is carried out of line of the throat $i$ to allow the driver $l$ to enter said throat. When going down it forces the driver $l$ to one side of the opening in the throat to allow the awl to pass through such opening.

The awl-bar $k'$ is raised by means of a cam, $k''$, on the driving-shaft $c$, acting on a pin and roll, $k'''$, on a rocker-lever, $k^{iv}$, (shown in dotted lines in Fig. 4,) hinged to a fulcrum-pin, $k^v$, in the movable head $b$. The lever $k^{iv}$ has a laterally-movable block, $k^{vi}$, in a slot in its free end, and through said block passes a pin, $k^{vii}$, into the awl-bar $k'$, to which it is secured. The awl-bar $k'$ is driven down by means of a coiled spring, $k^{viii}$, surrounding the awl-bar, between its collar $k^{ix}$ and the upper bearing, $b'$, as shown in Fig. 4, in the usual way. The lateral motion is imparted to the awl-bar by means of a stud and roll, $m$, thereon, which roll works in a slotted cam-groove, $m'$, in the face plate or cover $m''$ of the movable head $b$, as shown in Fig. 1.

To the frame $a$, on each side of the movable head $b$, is secured a spring, $n$, that acts as an elastic stop or cushion for the head $b$ when nearly approaching the end of its stroke in either direction, so as to prevent the shock on the head $b$ and its connecting mechanism caused by the momentum of its parts.

$o$ is the stationary nail-reservoir for the nails, and is provided with a central bearing-sleeve, $o'$, for the hopper-shaft $o''$, which is set in a rotary motion by means of a pulley, O, on the driving-shaft $c$, and a belt, O', leading to a pulley, O'', on the hopper-shaft $o''$. To the front of the hopper-shaft $o''$ is secured a perforated disk, $o'''$, having an annular rim, $o^{iv}$, projecting within the open end of the reservoir $o$, and to the inside of said rim are secured or cast in one piece the hoppers $o^v$ $o^v$, or nail-lifters, by which the nails are raised from the receptacle $o$ and delivered to the ribbed shield $p$, having ribs $p'$ $p'$ $p'$, for the purpose of properly delivering the nails into the space $q$, between the raceways $q'$ $q'$, the latter being provided with a stationary cover, Q, to prevent the nails from jumping out of the raceways while being fed down toward the picker. The annular rim $o^{iv}$ on the perforated hopper-wheel $o'''$ is to prevent the points of the nails or slivers from wedging between the hoppers $o^v$ and the curved wall of the receptacle $o$. The receptacle $o$ is provided in front with a partial cover, $r$, having an opening, $r'$, at the top, through which the proper working of the hoppers $o^v$ can be ascertained, and also to clear the raceways $q'$ $q'$, in case they should be clogged up.

$r''$ is an apron on the partial front plate, $r$, which is for the purpose of receiving any nails that may be thrown out by the hoppers through the rotary perforated disk $o'''$, and to conduct them back into the reservoir $o$. The front plate, $r$, is adjusted to and from the perforated disk $o'''$ by means of screws $r'''$, screwed into the flange of the reservoir $o$, and passing through hollow screws $r^{iv}$, screwed through the plate or cover $r$, as shown in Fig. 5, so as to be able to set up the plate or cover $r$ to the rotary perforated disk $o'''$ as close as possible without binding. The rotary disk $o'''$ is provided with ratchet-teeth or projections $o^{vi}$ $o^{vi}$, acting on a hammer-lever, $s$, provided with the usual spring, and having a hammer, $s'$, adapted to strike one of the raceways $q'$, so as to start the nails on their way to the driver and to prevent their clogging or sticking in the raceways.

The operation of the machine is as follows: After the shoe $t$ is placed on the last on its usual jack and held up against the throat of the machine, the awl $k$ descends and is forced by the cam-groove $m'$ on the face-plate $m''$ in a line with the opening in the throat, and at the same time through the throat into the shoe, and when the awl reaches its lowest position the head $b$, awl $k$, and shoe $t$ move together the distance of one nail from another, and at the time the head $b$ reaches the limit of its stroke toward the nail-reservoir $o$ the nail drops through the perforation $h'$ in the lower nail-rest, $h$, when the point of the nail is resting against the side of the awl $k$, which is still in the throat $i$; and at this time a nail is taken from the end of the raceways by the wedge-shaped picker $g^v$ and confined in the recess $G'$ of the bracket $G$. The awl $k$ now ascends by means of its lifting-cam $k''$, allowing the nail to drop directly through the throat $i$ into the perforation made in the leather by the chisel-shaped and countersunk awl $k$, by which the point of the nail is perfectly centered in line with the throat. The driver $l$ now descends through the throat $i$ and drives the nail and clinches it against the metal cover of the last of the boot. During the descent of the awl $k$ it springs the lower end of the driver $l$ to one side enough to allow the awl to enter the throat $i$. After the nail is driven the rocking foot $d^v$ descends and carries the shoe $t$ below from contact with the corrugated surface $i''$ of the throat $i$. The driver-bar $l'$ then begins to rise and the head $b$ to move back to its original position, and when reached the foot $d^v$ ascends and the shoe $t$ is brought to bear against the throat-surface $i''$, and the nail is allowed to drop in the intermediate tunnel, $G''$, its point resting against the lower nail-rest, $h$, until the awl $k$ again descends and the head $b$ is fed toward the nail-reservoir $o$, when the nail again rests against the awl $k$ preparatory to dropping into the throat $i$ and hole in the shoe, to be driven by the driver $l$, and so on.

As shown in Fig. 10, the point K is made chisel-shaped, so as to make a hole in the leather corresponding to the shape of the nail shown in Fig. 11, by which the nail is properly directed into the hole made in the leather without the aid of spring-dies, as heretofore used, and by making the hole in the leather with a chisel-shaped bottom, by the means above described, I am able to determine a uniform position in which the nails are to be clinched in the shoe-sole. The upper end, $K'$, of the awl that enters the leather is made with a countersink, as shown in Fig. 10, corresponding to the head of the nail, as shown in Fig. 11, by which a conical recess is made in the upper part of the shoe-sole, for the purpose of guiding the point of the nail when entering the leather, and also for receiving the countersink head of the nail when driven, to prevent the surface of the leather around the head of the nail from being forced below the surface of the sole, which would be the case if the nail were to be driven into a straight hole.

In connection with the lever $g'$, which operates the wedge-shaped picker $g^v$, is attached a wedge-shaped wire, $u$, which passes under spring $v$ on raceways $q'$ $q'$, and allows the nails to pass down the raceways against the spring-gage $g^{vi}$ when the separator $g^v$ is withdrawn, and at the instant the separator begins to pass in the wedge $u$ passes from under the spring $v$ and allows the V-shaped head $v'$ on the end of the spring $v$ to force down between the heads of the first and second nails, by which their points are forced apart, as shown in Fig. 12, and allows the wedge-picker $g^v$ to enter and separate the nails for the purpose of insuring a positive and uniform delivery of the nails.

Having thus fully described the nature, construction, and operation of my invention, I wish to secure by Letters Patent, and claim—

1. In a nail-driving machine, the combination of the rotary driving-shaft $c$, grooved cam $d$, vertically-movable rod $d'$ $d''$, and the rocking lever $d'''$, with its foot or rest $d^v$, as and for the purpose set forth.

2. In a nail-driving machine, the combination of the rocking lever $d'''$ and its foot or rest $d^v$ with the adjustable gage $d^{vi}$, as and for the purpose set forth.

3. In a nail-driving machine, the combination of the rotary driving-shaft $c$, grooved cam $e$, rocking levers $e'$ and $f$, with their adjustable connecting device $e^{iv}$ $e^v$, shaft $f'$, lever $f''$, and connecting device $f'''$ $f^{iv}$ to the laterally-movable head $b$, as and for the purpose described.

4. In a nail-driving machine, the combination of the frame $a$, laterally-movable head $b$, and the elastic spring-stops $n$ $n$, as and for the purpose set forth.

5. In a nail-driving machine, the combination of the rotary driving-shaft $c$, cam $g$, lever $g'$, and spring $g''$, bracket $G$, and wedge-shaped nail-separator $g^v$, as and for the purpose set forth.

6. In combination with the bracket $G$ and wedge-shaped nail-separator $g^v$, the adjustable spring-gage $g^{vi}$ and set-screw $g^{vii}$, as and for the purpose set forth.

7. In a nail-driving machine, the combination of the bracket $G$, its recess $G'$, intermediate tube, $G''$, and lower perforated nail-rest $h$ $h'$, as and for the purpose set forth.

8. In a nail-driving machine, the combination of the driving-shaft $c$, movable head $b$, cam $k''$, lever $k^{iv}$, and its connection $k^{vi}$ $k^{vii}$ to the vertically and laterally adjustable awl-bar $k'$, having awl $k$ and coiled spring $k^{viii}$, as and for the purpose set forth.

9. In a nail-driving machine, the vertically-adjustable awl-bar $k'$, with its stud and roll $m$, in combination with the cam groove $m'$ in the face-plate $m''$, for the purpose of imparting a lateral motion to said awl-bar and its awl $k$, as herein set forth and described.

10. In a nail-driving machine, the nail-receptacle $o$, having central sleeve-bearing, $o'$, in combination with the rotary shaft $o''$, its perforated hopper-wheel $o'''$, with its annular rim $o^{iv}$, and hoppers $o^v$ $o^v$, as and for the purpose set forth.

11. In a nail-driving machine, the combination of the nail-receptacle $o$, rotary hopper-wheel $o'''$ $o^{iv}$ $o^v$ $o^v$, the partial front plate, $r$, and adjusting-screws $r'''$ $r^{iv}$, as and for the purpose set forth.

12. In a nail-driving machine, the nail-receptacle o, rotary hopper-wheel $o'''$ $o^{IV}$ $o^{V}$ $o^{V}$, partial front plate, $r$, and apron $r''$, as and for the purpose set forth.

13. In a nail-driving machine, the nail-receptacle $o$, rotary hopper-wheel $o'''$ $o^{IV}$ $o^{V}$, raceways $q'$ $q'$, and plate $p$, with its ribs $p'$ $p'$ $p'$, as and for the purpose set forth.

14. In a nail-driving machine, the awl $k$, having chisel-point K and countersink K', as and for the purpose set forth.

15. In a nail-driving machine, the combination of raceways $q'$ $q'$, the stationary cover Q, the spring $v$, with its V-shaped lip $v'$, and wedge-shaped rod $u$, as and for the purpose described.

In testimony whereof I have affixed my signature in presence of two witnesses.

EDWARD MERRITT.

Witnesses:
ALBAN ANDRÉN,
HENRY CHADBOURN.